UNITED STATES PATENT OFFICE.

WALTHER FELD, OF HÖNNINGEN-ON-THE-RHINE, GERMANY.

EXTRACTION OF AMMONIA FROM GAS.

No. 837,045.   Specification of Letters Patent.   Patented Nov. 27, 1906.

Application filed August 27, 1906. Serial No. 332,305.

*To all whom it may concern:*

Be it known that I, WALTHER FELD, chemist and manufacturer, a subject of the King of Prussia, German Emperor, residing at Hönningen-on-the-Rhine, in the German Empire, have invented new and useful Improvements in the Treatment of Gases for the Extraction of Ammonia Therefrom, of which the following is a specification.

This invention relates to the extraction of ammonia from gases containing ammonia—such, for instance, as coal-gas and the like. Hitherto such gases have been washed with water in order to obtain ammoniacal liquor; but in consequence of the volatile nature of ammonia the resulting ammoniacal liquor has been very weak and a considerable amount of ammonia has been left in the gases to an extent at least corresponding to the tension of the ammonia in solution at the temperature of the gases, and the ammoniacal liquor has been contaminated by sulfur and other impurities from the gases. In distilling this weak and impure ammoniacal liquor not only does a considerable loss of ammonia occur, but part of the impurities, such as sulfureted hydrogen, is distilled off with the ammonia and the ammonium compounds produced are impure and of low concentration.

In order to obtain pure and concentrated ammoniacal liquors from which the ammonia can be produced by distillation in a concentrated and pure condition, I wash the gases with a solution of a salt of magnesium, such as a chlorid, a sulfate, or a nitrate, or the like. In washing the gases (for example, coal-gas or similar gases) with a solution of sulfate of magnesium, for example, under the simultaneous reaction of ammonia and carbonic acid carbonate of magnesium and sulfate of ammonium are formed and sulfureted hydrogen is absorbed. The ammonia is completely extracted from the gases, the strength of the ammonium-sulfate solution employed depending on the strength of the magnesium-salt solution used. On boiling this mixture of magnesium carbonate and ammonium sulfate magnesium sulfate is regenerated, while carbonic acid and ammonia are distilled off, the said ammonia being pure and concentrated. It is not necessary to boil till all the ammonium salt is decomposed, because the regenerated magnesia solution can be used over and over again for the gas-washing process, and therefore the ammonia left in the solution after distillation is not lost, because it will be recovered at the next or a succeeding distilling operation.

The nature of the carbonate of magnesium formed by the action of the gases upon the magnesium-salt solution depends on the molecular proportion in which carbonic acid and ammonia are in the gases. If this proportion be less than one to two, basic magnesium carbonate is formed, while if it be more than one to two a mixture of basic carbonate with neutral carbonate (or even with bicarbonate of magnesium) is formed. The nature of this carbonate or these carbonates does not interfere with the completeness of the extraction of ammonia.

The washing process may be carried out in any suitable gas-washer. The resulting mixture of magnesium carbonate and ammonium salt being muddy, the most suitable washer is that constructed as described in the specification of United States Letters Patent No. 829,261, granted to me August 21, 1906. In consequence of the quantity of carbonate of magnesium the mixture is often so thick or stiff that the washer and the distilling apparatus are liable to become choked. To avoid this, I add to the magnesium-salt solution before it is used for the washing or distilling a salt or salts which will prevent this thickening or stiffening. Suitable salts for this purpose are, for example, the chlorids, the sulfates, and similar salts of sodium, potassium, and ammonium, and the like. It is convenient to use a salt of the same acid as that of the magnesium salt used.

The following is an example of how this invention may be performed, magnesium chlorid being taken as the salt of magnesium employed for the absorption of ammonia and ammonium chlorid being taken as the salt used to prevent the precipitate of carbonate of magnesium from becoming too thick or stiff; but it is to be understood that I do not limit myself to the use of these substances nor to the proportions given. From one hundred and fifty grams to two hundred and fifty grams of magnesium chlorid and from fifty grams to one hundred and fifty grams of ammonium chlorid are dissolved in one liter of water, for example; but other proportions and consequent concentration may be used, the quantity of salts used depending on the amount of ammonia to be absorbed. The gases may, for instance, contain one molecular proportion of carbonic acid to two and a half molecular proportions of ammonia. On the gas being passed through the solution ammonia and carbonic acid will be absorbed and magnesium carbonate will be precipitated. After nearly all the magnesium salt is decomposed the mixture is run into the distilling apparatus and heated. First, carbonic acid will distil off, this containing the more ammonia the higher the temperature rises. With the distillation of the ammonia the precipitate of magnesium carbonate diminishes, chlorid of magnesium being regenerated at the same time. It it not necessary to boil so long that all the ammonium salt is decomposed, as the liquor can be reused for absorption even if there be left in the solution as much as twenty or more per cent. of the ammonia. After being cooled to such a temperature that no further ammonia distils off the liquor can be reused for absorption. The presence of the excess of ammonium salt added to the magnesium salt in the solution will prevent the liquor from getting too thick or stiff either in the absorption apparatus or in the distilling apparatus.

Having now particularly described and ascertained the nature of my said invention and in what manner the same is to be performed, I declare that what I claim is—

1. In the extraction of ammonia from gases by treating such gases with a solution of a salt of magnesium; the addition, to the solution of the salt of magnesium, of a salt which will prevent the precipitate of the salt of magnesium from becoming too thick, or stiff.

2. In the extraction of ammonia from gases by treating such gases with a solution of a salt of magnesium, the addition, to the solution of the salt of magnesium, of an alkaline salt for the purpose aforesaid.

3. In the extraction of ammonia from gases by treating such gases with a solution of a salt of magnesium; the addition, to the salt of magnesium, of a salt of ammonium, for the purpose aforesaid.

In testimony whereof I have signed this specification in the presence of two subscribing witnesses.

WALTHER FELD.

Witnesses:
 WOLDEMAR HAUPT,
 HENRY HASPER.